United States Patent
Iwase et al.

[11] Patent Number: 5,937,230
[45] Date of Patent: Aug. 10, 1999

[54] TEMPERATURE DETECTING DEVICE FOR ROTATING MEMBERS

[75] Inventors: Hiroyasu Iwase; Toshio Sakata, both of Toyohashi, Japan

[73] Assignee: Minolta Co., Ltd., Osaka, Japan

[21] Appl. No.: 08/745,341

[22] Filed: Nov. 8, 1996

[30] Foreign Application Priority Data

Nov. 10, 1995 [JP] Japan .................................. 7-292471

[51] Int. Cl.⁶ .................................................. G03G 15/20
[52] U.S. Cl. ............................................................ 399/69
[58] Field of Search ................................ 39/33, 67, 69; 219/216

[56] References Cited

U.S. PATENT DOCUMENTS

| | | | |
|---|---|---|---|
| 4,737,818 | 4/1988 | Tanaka et al. | 219/216 X |
| 4,745,430 | 5/1988 | Tsuchiya | 399/33 |
| 4,812,873 | 3/1989 | Inagaki et al. | 219/216 X |
| 4,905,051 | 2/1990 | Satoh et al. | 399/69 |
| 4,949,131 | 8/1990 | Ito | 399/69 |
| 4,949,132 | 8/1990 | Chimoto | 219/216 X |
| 5,281,793 | 1/1994 | Gavin et al. | 219/216 |
| 5,287,155 | 2/1994 | Arai et al. | 219/216 X |
| 5,329,342 | 7/1994 | Shirai et al. | 399/33 |

*Primary Examiner*—Fred L. Braun
*Attorney, Agent, or Firm*—McDermott, Will & Emery

[57] ABSTRACT

A temperature detecting device in which a sensor is lightly pressed against a rotating member for temperature detection and kept precisely in a desired position. A swing frame having a free end at its one end facing the rotating member is rotatably mounted on a shaft parallel to a shaft of the rotating member. The sensor is supported by the free end of the swing frame and brought into contact with the rotating member by the resiliency of plate springs provided in the swing frame.

11 Claims, 4 Drawing Sheets

TEMPERATURE DETECTING DEVICE FOR ROTATING MEMBERS

BACKGROUND OF THE INVENTION

1. Technical Field of the Invention

The present invention relates to a temperature detecting device for rotating members which is, for example, used to control the temperature of a heat fixing roller in various kinds of electrophotographic image forming apparatuses.

2. Description of Related Art

In an ordinary type of a heat fixing device used in the above mentioned image forming apparatuses, a toner image electrostatically transferred to a sheet is fused and fixed by passing the sheet through the nip of a pair of fuser rollers in pressure engagement, at least one of which is heated by a heat source. The roller(s) is maintained at a temperature within a predetermined range by monitoring and controlling heat generation by the heat source based on the temperature detected by a sensor in order to conduct the above-described fixing process effectively.

FIG. 4 shows a conventional structure for supporting a sensor for controlling temperature such as a thermostat or a thermistor in a fixing device 50. A fuser roller 51 and a pressure roller 52 are mounted within the housing 60 of the fixing device 50 in tight contact with each other. Both rollers 51, 52 are heated internally by heat sources, and sensors 53, 54 are pressed against a peripheral surface of the rollers 51, 52 for temperature detection, based on which application of electricity to the heat sources is controlled so as to keep the rollers at a predetermined temperature.

A pair of plate springs 57, 58, one end of which is fixed by mounting members 55, 56 to the fixing device 50, is provided for mounting the sensors 53, 54. The other end of the plating springs 57, 58 is coupled to the sensors 53, 54. The plate springs 57, 58 are bent to form a U-shape in cross section and press the sensors 53, 54 which are coupled to the other end of the plate springs 57, 58 on to the rollers 51, 52 by their resiliency.

As described above, the sensors 53, 54 are positioned and pressed on the roller only by means of plate springs 57, 58. If the pressing force is not strong enough (if the sensors 53, 54 are not pressed tightly enough on the roller), the sensors 53, 54 may slip out of position and worst of all lose contact with the rollers 51, 52 at their either side, causing inaccuracy in temperature detection. In order to prevent an unwanted slippage of the sensors 53, 54, the pressing force by the plate springs 57, 58 is set around 100 gram-force, but yet it is not enough to keep the sensors 53, 54 stably in place and to achieve enough accuracy in detection required in recent high-speeded copying machines. On the other hand, if the pressing force is too strong, the sensors 53, 54 as well as the rollers 51, 52 will soon be worn down.

BRIEF SUMMARY OF THE INVENTION

In view of the foregoing, it is a primary object of the present invention to provide a temperature detecting device for a rotating member which supports and lightly presses a sensor onto a roller at a precise position, assuring accurate detection and having high durability.

In order to accomplish the above said object, the temperature detecting device of the present invention comprises a shaft equipped within a fixing device and parallel to that of a rotating member, a swing frame rotatably supported by the shaft, a spring disposed between the swing frame and an inner wall of the fixing device, the swing frame having a free end facing to the rotating member, the free end supporting a temperature sensor which is pressed against the rotating member by resiliency of the spring.

In the above described structure of the present invention, the sensor can be positioned and kept in a desired place on the rotating member by the swing frame having the sensor at its free end and pivotally supported by a shaft, unlike a conventional structure in which only a plate spring is used to position and to press a sensor on a roller. The sensor is therefore stably kept in place, whereby accuracy in detection is increased and durability of both the sensor and the rotating member is improved since it is no more necessary to press the sensor tightly enough on the rotating member to prevent an unwanted slippage of the sensor.

The temperature detecting device of the present invention is thus appropriate for the recent high speeded and high quality image producing image forming apparatuses.

These and other objects and features of the present invention will become more apparent from the following description taken in conjunction with the accompanying drawings which illustrate specific embodiments of the invention.

DETAILED DESCRIPTION OF THE INVENTION

Figure 1:
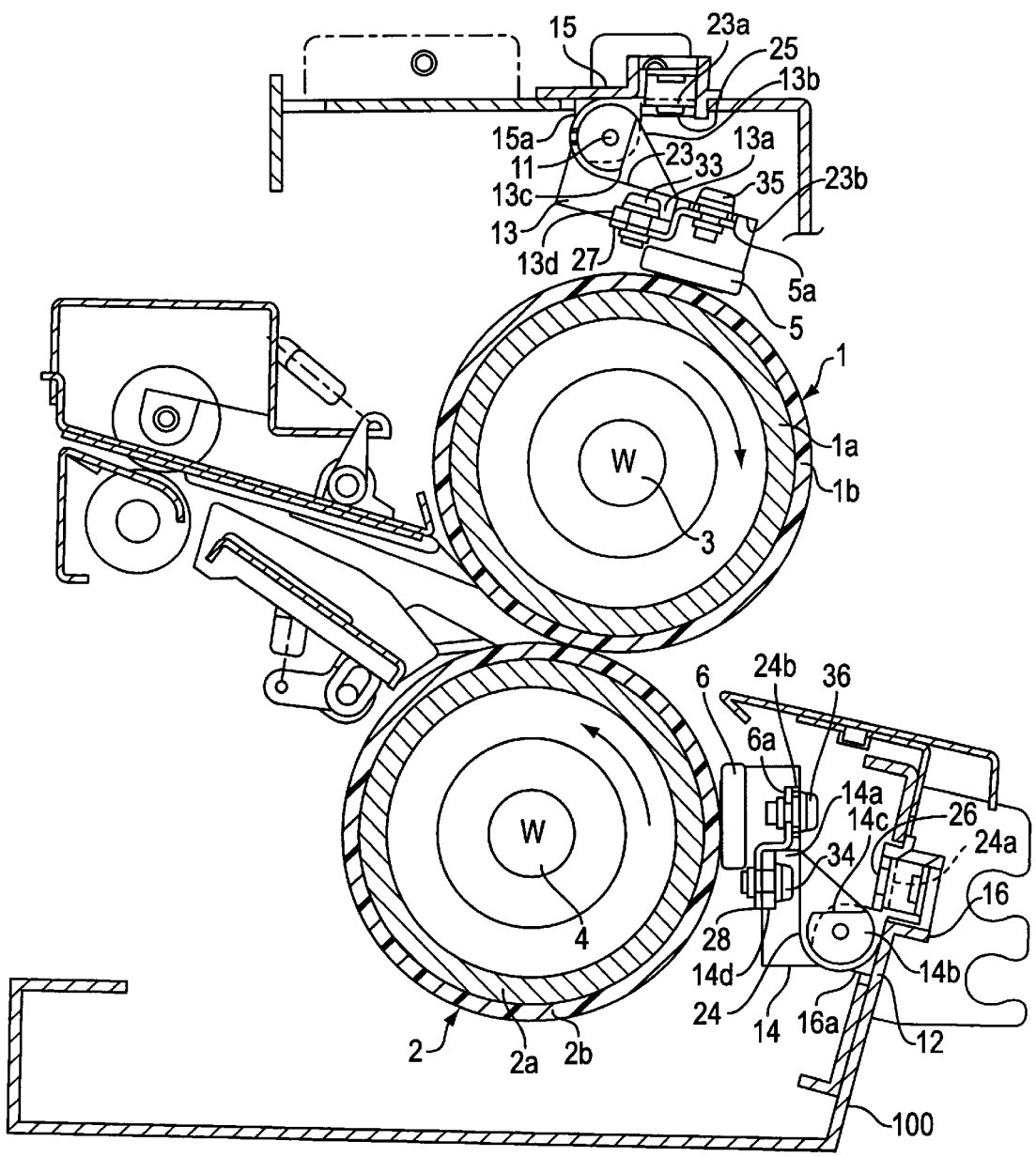
FIG. 1 is a sectional view showing a first embodiment of the present invention applied in a fixing device.
Figure 2:
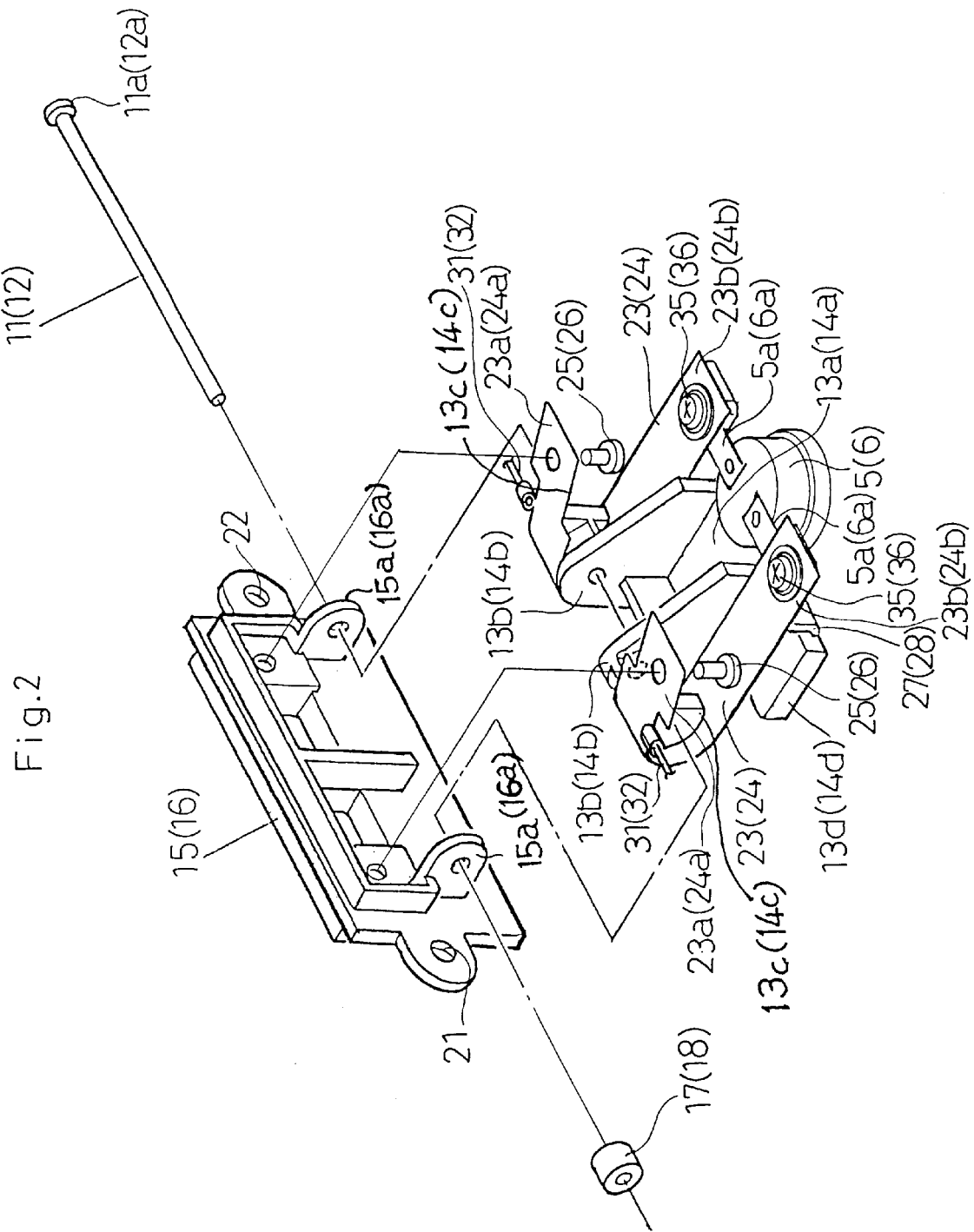
FIG. 2 is an exploded perspective view showing a structure for supporting a sensor in the fixing device of FIG. 1.

A first embodiment of the present invention will now be described hereinafter referring to FIGS. 1 and 2 which show a fixing device 100 in which the temperature detecting device of the present invention is applied. The fixing device 100 shown in FIG. 1 is a heat fixing device used in an electrophotographic copying machine and has a fixing roller 1 and a pressure roller 2 which are in contact with each other. The fixing roller 1 and the pressure roller 2 rotate in the direction of the arrows respectively, and a sheet is discharged by the discharge rollers to the left of the rollers 1, 2. At least either one of the rollers 1, 2 needs to have a heat source to fuse and fix a toner image on a recording sheet passing through the nip of the rollers 1, 2 after the electrostatic transfer process. In this embodiment both of the fixing roller 1 and the pressure roller 2 have halogen lamps 3, 4 within them as their heat sources. The rollers could be heated in various ways, employing other kinds of heat sources.

The rollers 1, 2 generally comprise inner cores 1a, 2a made of heat conductive material such as aluminum and plastic layers 1b, 2b as an elastic layer on their surfaces. The construction of the rollers 1, 2 is not limited to the one described above, and the pressure roller 2 may be, for example, coated with fluoroplastic instead of having an elastic layer. Both rollers 1, 2 are brought in contact with each other with about 3 kg/cm$^2$ to conduct heat fixing.

Thermostats 5, 6 as a temperature sensor are pressed at a predetermined position against a peripheral surface of the rollers 1, 2. Application of electricity to the halogen lamps 3, 4 is controlled by switching on/off the electricity supply based on the detected temperature so as to keep the surface of the rollers 1, 2 at a temperature within a predetermined range. In case a sensor without an on-off switching function like a thermistor is employed, the halogen lamps 3, 4 may be controlled by other controlling means such as a microcomputer based on the temperature detected by the sensor.

In this embodiment, a swing frame 13 (14) is provided for supporting the thermostat 5 (6) in a fixing device having a rotating member such as the fixing roller 1 and the pressure roller 2. The swing frame 13 (14) is pivotally supported by a shaft 11 (12) which is parallel to the shafts of the rollers 1, 2. The swing frame 13 (14) is made of a rigid insulating material such as synthetic resin and has a free end 13a (14a) which can freely swing around the shaft 11 (12) and supports the thermostat 5 (6) in a manner to face the roller 1 (2) where temperature is detected. The thermostat 5 (6) is pressed onto the temperature detecting part of the roller 1 (2), using resiliency of a plate spring 23 (24) disposed in the swing frame 13 (14).

A bearing 15 (16) having a pair of bearing pieces 15a, 15a (16a, 16a), uniformly made at both ends of the bearing 15 (16) is fixedly provided in the fixing device in order to rotatably support the swing frame 13 (14). The shaft 11 (12) passing through the swing frame 13 (14) is received by the pair of bearing pieces 15a, 15a (16a, 16a) and secured to the bearing 15 (16) by its nail-headed end 11a (12a) and a collar 17 (18) at the opposite end. The bearing 15 (16) is bolted through holes 21, 22 provided at both ends of the bearing 15 (16) to the fixing device. The swing frame 13 (14) is pivotally supported in such a way that a bifurcating frame base 13b (14b) is held between the pair of bearing pieces 15a, 15a (16a, 16a), with the shaft 11 (12) passing through the swing frame 13 (14), whereby allowing the swing frame 13 (14) to swing around the shaft 11 (12).

The bifurcating frame base 13b (14b) has a pair of semicircular bosses 13c, 13c (14c, 14c) at both outer sides, with their circular arcs facing to the bearing 15 (16). A pair of plate springs 23, 23 (24, 24) made of metal is bent to form a U-shape in cross section and fitted in the swing frame 13 (14) in such a manner that the plate springs 23, 23 (24, 24) surround the semicircular bosses 13c, 13c (14c, 14c), the curved parts going along the circular arc of the bosses 13c, 13c (14c, 14c) and being held between the bearing 15 (16) and the swing frame 13 (14).

The plate springs 23, 23 (24, 24) are bolted to the bearing 15 (16) at their ends 23a, 23a (24a, 24a) facing the bearing 15 (16) by bolts 25, 25 (26, 26). The opposite ends 23b, 23b (24b, 24b) of the plate springs 23, 23 (24, 24) facing to the swing frame 13 (14) are bolted to a pair of metal links 27, 27 (28, 28) which are provided at both sides of the free end 13a (14a) of the swing frame 13 (14) by bolts 35, 35 (36, 36).

The pair of plate springs 23, 23 (24, 24) is disposed between the bearing 15 (16) and the swing frame 13 (14) so that the thermostat 5 (6) is pressed against each roller 1 (2) by the resiliency of the plate springs 23, 24.

The metal links 27, 27 (28, 28) are disposed to electrically connect each pair of terminals 5a, 5a (6a, 6a) of the thermostat 5 (6) to the plate springs 23, 23 (24, 24) made of metal so that the plate springs 23, 23 (24, 24) function as an electric conductor for the thermostat 5 (6). The metal links 27, 27 (28, 28) are, therefore, bolted at their both ends, one end to a pair of projecting pieces 13d, 13d (14d, 14d) of the swing frame 13 (14) by bolts 33, 33 (34, 34), and the opposite end to the plate springs 23, 23 (24, 24) overlapping a pair of terminals 5a, 5a (6a, 6a) of the thermostat 5 (6) by bolts 35, 35 (36, 36).

Lead wires 31, 31 (32, 32) are coupled to the plate springs 23, 23 (24, 24) at their ends 23a, 23a (24a, 24a) facing the bearing 15 (16), and connect the thermostat 5 (6) to a controlling means such as a computer.

According to the present invention, the thermostat 5 (6) pressed against the roller 1 (2) where the temperature is detected is supported by the free end 13a (14a) of the swing frame 13 (14) which is rotatably mounted on the shaft 11 (12). The swing frame 13 (14), by being pivotally supported by the shaft 11 (12), fixedly positions the thermostat 5 (6) supported by its free end 13a (14a). Thus, when pressing the thermostat 5 (6) against a rotating member, resiliency of springs 23, 23 (24, 24) is not used to exert enough pressing force but merely to bring the thermostat 5 (6) lightly in contact with the rotating member. The thermostat 5 (6) is stably positioned at a desired point on the roller 1 (2) where the temperature is detected without slipping or tilting affected by rotating force of the rollers 1, 2, whereby increasing accuracy in detection. Additionally, both the thermostats 5, 6 and the rollers 1, 2 will be less eroded and last long, as the springs 23, 23 (24, 24) are only lightly in contact with the rollers 1, 2. In practice, the pressure of about 30 gram-force gave a satisfactory result.

A temperature sensor having such positional stability and durability is thus appropriate for the high quality printing in recent high-speeded image forming apparatuses.

If a lead wire is provided to the thermostats 5, 6 or other types of sensors, the plate springs 23, 24 need not be utilized as an electric conductor.

Alternatively, a coiled spring or any other springs may be used to press the thermostats 5, 6 against the rollers 1, 2, although a plate spring is most preferably used as hitherto described and disposed in this embodiment because it occupies little space and thus appropriate for simple and compact structure.

The semicircular bosses 13c, 14c provided in the swing frame 13, 14 prevent a short circuit which may be caused by the springs 23, 24 as an electric conductor touching the shaft 11, 12.

Figure 3:
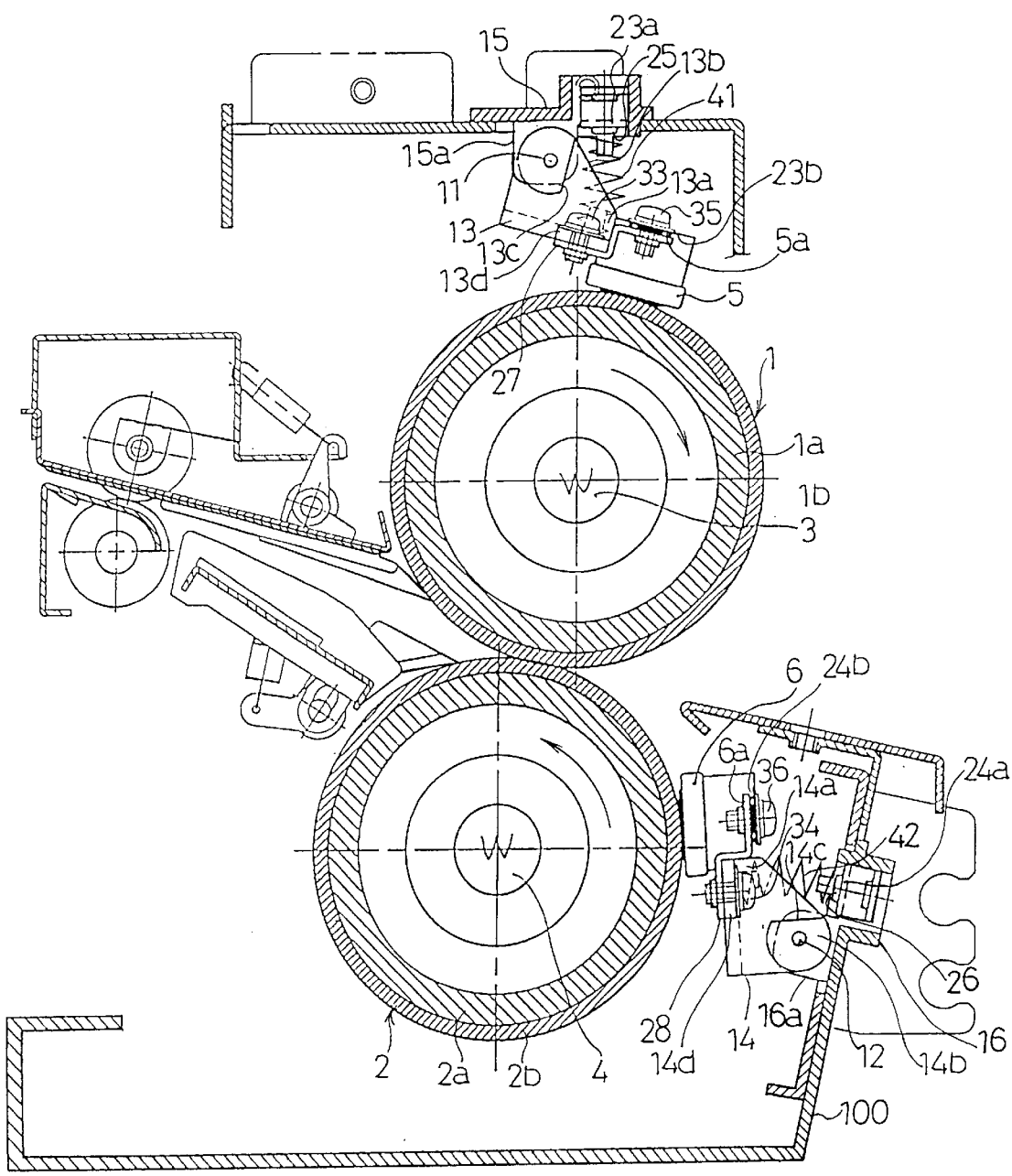
FIG. 3 is a sectional view showing a second embodiment of the present invention applied in a fixing device.
Figure 4:
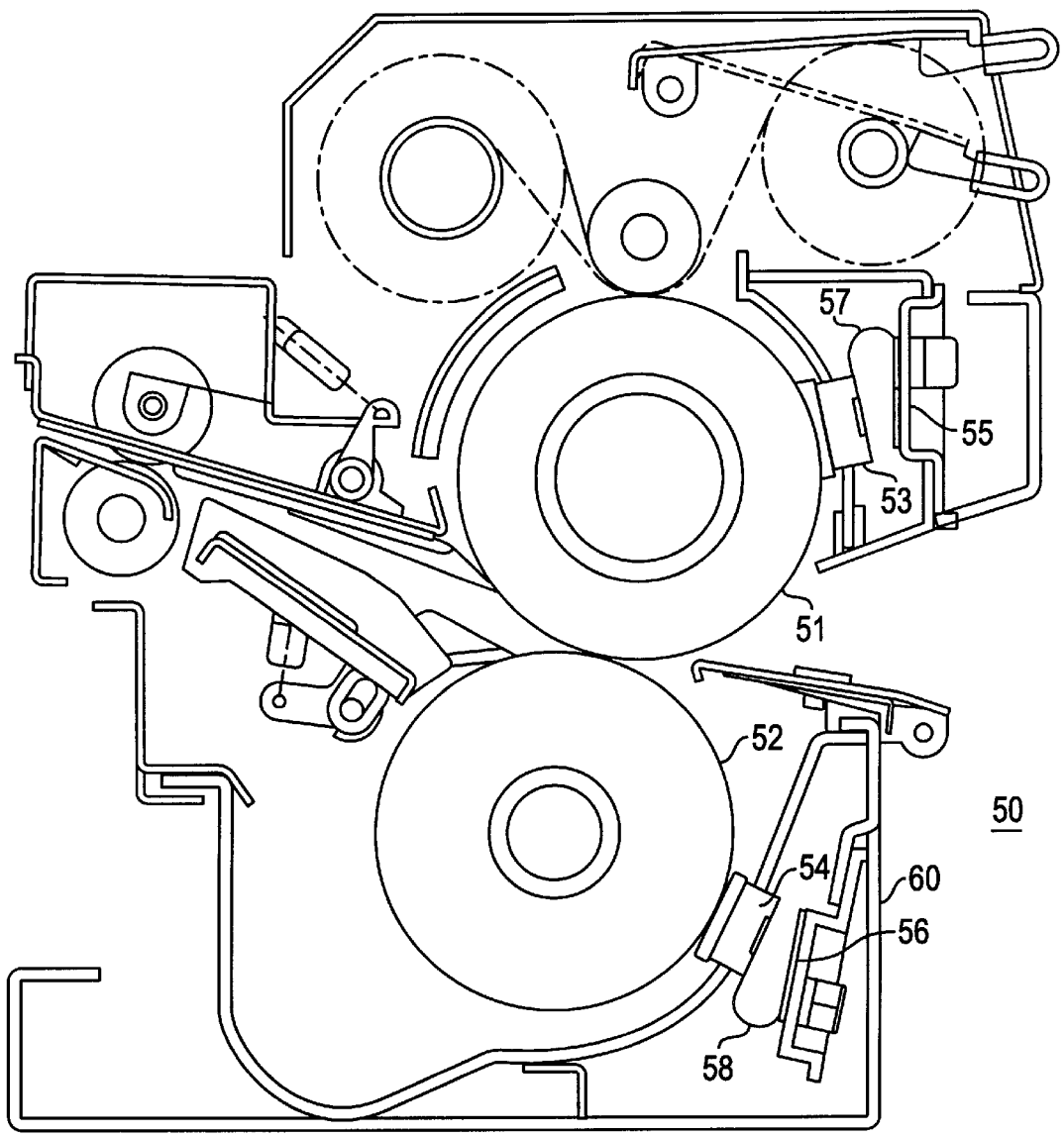
FIG. 4 is a sectional view showing a conventional fixing device.

FIG. 3 shows a second embodiment of the present invention. In this embodiment, coiled springs 41, 42 are employed instead of plate springs 23, 24 between the bearing 15 (16) and the swing frame 13 (14). Descriptions on other elements which bear the same reference numbers as in FIG. 1 and advantages of this embodiment will be omitted as they are identical to those of the first embodiment.

It should be understood that the temperature detecting device of the present invention is not exclusively used for a fixing device of an electrophotographic image forming apparatus as described in the above description but can be applied to all sorts of apparatuses having a rotating member in which the temperature of the rotating member is measured by pressing a sensor against the rotating member.

Spring members such as a plate spring or a coil spring may not necessarily be used in the temperature detecting device of the present invention, provided that the sensors are positioned on the rotating member and can be kept in stable contact with the rotating member by their own weight.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

We claim:

1. A detecting device for detecting a condition of a rotating member comprising:
   a supporting member;
   a swing frame rotatably supported by a shaft parallel to the rotating member, having a free end which faces a part of the rotating member where the condition is detected;
   a sensor for detecting the condition of the rotating member disposed at the free end of the swing frame; and
   a force exerting means for pressing the sensor onto the part of the rotating member where the condition is detected, wherein the force exerting means includes a boss which is formed at an axis point of the swing frame, and a plate spring wrapping around said boss to form a U-shape and having one end connected to at least one of the sensor and the swing frame and another end connected to the supporting member.

2. The detecting device according to claim 1, wherein the free end of the swing frame positions downstream of an axis point of the swing frame with respect to a moving direction of a periphery of the rotating member.

3. The detecting device according to claim 1, wherein the force exerting means includes a spring made of metal, one end of which is connected to the sensor while the other end is connected to the supporting member, said spring functioning as a conductor transmitting an output from the sensor to an outer controlling means.

4. The detecting device according to claim 1, wherein said plate spring has one end connected to the sensor and another end connected to the supporting member.

5. The detecting device according to claim 1, wherein said rotating member is one of a fixing roller and a pressure roller.

6. The detecting device according to claim 1, wherein said sensor detects temperature of the periphery of the rotating member.

7. A detecting device for detecting a condition of a moving member which moves in a moving direction, said detecting device comprising:
   a hinge including a first member, a second member, and a shaft, said first member being swingably connected with said second member by said shaft, said first member being detachably connected to a frame to which the moving member is movably connected; and
   a condition detecting sensor disposed at a free end of said second member and for touching a periphery of the moving member; and
   a force exerting means for pressing the condition detecting sensor onto a part of the moving member where the condition is detected, wherein the force exerting means includes a boss which is formed at an axis point of said hinge, and a plate spring wrapping around said boss to form a U-shape and having one end connected to at least one of the condition detecting sensor and the first member and another end connected to said second member.

8. The detecting device according to claim 7, wherein the free end of said second member positions downstream of said shaft with respect to the moving direction of a periphery of the moving member in a case where said first member is connected to the frame.

9. The detecting device according to claim 7, wherein said condition detecting sensor detects temperature of the periphery of the moving member.

10. The detecting device according to claim 7, wherein said first member has a hole through which a bolt is connected to the frame.

11. A fixing device comprising:
    a fixing roller;
    a pressure roller arranged to be in tight contact with the fixing roller;
    a member for supporting the fixing roller and the pressure roller;
    a swing frame swingably coupled to the member;
    a sensor for detecting temperature disposed at a free end of the swing frame and touching a periphery of the fixing roller; and
    a force exerting means for pressing the sensor onto the periphery of the fixing roller, wherein the force exerting means includes a boss which is formed at an axis point of said swing frame, and a plate spring wrapping around said boss to form a U-shape and having one end connected to at least one of the sensor and the swing frame and another end connected to said member.

* * * * *